US012657513B2

(12) United States Patent
Qin

(10) Patent No.: US 12,657,513 B2
(45) Date of Patent: Jun. 16, 2026

(54) IMPLICIT RATING RECOMMENDATIONS FEEDBACK LOOP

(71) Applicant: Microsoft Technology Licensing, LLC, Redmond, WA (US)

(72) Inventor: Yinghua Qin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 794 days.

(21) Appl. No.: 18/062,895

(22) Filed: Dec. 7, 2022

(65) Prior Publication Data

US 2024/0193463 A1      Jun. 13, 2024

(51) Int. Cl.
G06Q 30/0601      (2023.01)
G06N 20/00      (2019.01)
G06Q 30/0201      (2023.01)

(52) U.S. Cl.
CPC ......... G06N 20/00 (2019.01); G06Q 30/0201 (2013.01); G06Q 30/0631 (2013.01)

(58) Field of Classification Search
CPC . G06N 20/00; G06Q 30/0631; G06Q 30/0201
See application file for complete search history.

(56) References Cited

U.S. PATENT DOCUMENTS

| | | | | | |
|---|---|---|---|---|---|
| 6,438,579 | B1 * | 8/2002 | Hosken | .................. | G06Q 30/02 |
| | | | | | 707/999.005 |
| 8,037,080 | B2 * | 10/2011 | Koren | ................ | G06Q 30/0201 |
| | | | | | 707/913 |
| 10,423,861 | B2 * | 9/2019 | Gao | ........................ | G16B 20/00 |
| 11,023,819 | B2 * | 6/2021 | Sinha | ........................ | G06N 3/08 |
| 11,652,837 | B2 * | 5/2023 | Borah | ................. | H04L 63/0815 |
| | | | | | 726/5 |
| 2014/0075336 | A1 * | 3/2014 | Curtis | .................... | H04L 41/22 |
| | | | | | 715/753 |
| 2014/0222622 | A1 * | 8/2014 | Du | ....................... | G06F 16/9535 |
| | | | | | 705/26.63 |
| 2016/0036930 | A1 * | 2/2016 | Green | .................. | H04L 67/535 |
| | | | | | 709/224 |
| 2017/0230312 | A1 * | 8/2017 | Barrett | ................... | G06F 40/35 |
| 2020/0221181 | A1 * | 7/2020 | Gupta | ................ | G06F 16/7867 |
| 2021/0089331 | A1 | 3/2021 | Sheoran | | |
| 2022/0245047 | A1 | 8/2022 | You | | |
| 2024/0020481 | A1 * | 1/2024 | Brooks | .................. | G06F 40/30 |

OTHER PUBLICATIONS

International Search Report and Written Opinion received for PCT Application No. PCT/US2023/036828, Jan. 24, 2024, 12 pages.

* cited by examiner

*Primary Examiner* — Beau D Spratt
(74) *Attorney, Agent, or Firm* — ArentFox Schiff LLP

(57) ABSTRACT

Examples described herein generally relate to a computer device including a memory and a processing system configured to customize a user interface based on an implicit rating of user interface elements. The computer device monitors user interactions with a user interface prior to a goal action. The computer device trains weights of a model, based on collected events over a first window of time, to generate an implicit rating that is predictive of the goal action. The computer device generates the implicit rating for a specific user of at least one element of the user interface based on the weights of the model applied to each type of event of the user over a second window of time. The computer device applies the implicit rating as an input to a collaborative filter to generate a recommendation to modify the local version of the user interface for the specific user.

20 Claims, 7 Drawing Sheets

300

310

320

330

$\alpha$ $x_1$ $x_{n-1}$ $x_n$ $w_0$ $w_1$ $w_{n-1}$ $w_n$ $\Sigma$

FIG. 5

IMPLICIT RATING RECOMMENDATIONS FEEDBACK LOOP

BACKGROUND

The present disclosure relates to user interfaces for computers, and more particularly to presenting recommendations to customize a user interface for a user.

Designers of a user interface may seek to include features with which users are likely to interact and perform desired actions. Designers may receive anecdotal feedback from test groups or end users. Such feedback may provide some guidance, but is limited in scope.

One approach to provide recommendations is to recommend content consumed by other users based on similarities between users and/or between the content of the user interface with which the user interacts. For example, where elements of a user interface are explicitly rated by users, a system may recommend highly rated elements to other users with similar profiles or to other users who rated similar elements. Explicit ratings, however, are not typically available for many elements of a user interface. For example, users may not rate informative or unpaid content. Further, explicit rating may be subjective and potentially biased, or may reflect a different criteria than a goal of the provider of the user interface. Additionally, similarity between content may be difficult for a computer to determine. Accordingly, recommendations based on explicit user ratings and element similarities may be of limited use, at least for some types of user interfaces.

Thus, there is a need in the art for improvements in user interfaces. In particular, there is a need for systems and methods for providing better implicit ratings for recommendations.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In some aspects, the techniques described herein relate to a computer device for customizing a user interface, including: memory; and a processing system including at least one processor communicatively coupled with the memory and configured to: monitor, for a plurality of users, user interactions with a user interface prior to a goal action, the monitoring including collecting page views and page actions between each user and a local version of the user interface; train weights of a model, based on the collected page views and page actions over a first window of time, to generate an implicit rating that is predictive of the goal action, wherein the weights are based on a machine-learning training to improve a correlation of the implicit rating with a rate of the goal action on the user interface; generate the implicit rating for a specific user of at least one element of the user interface based on the weights of the model applied to each type of page view and page action of the user over a second window of time; and apply the implicit rating as an input to a collaborative filter to generate a recommendation to modify the local version of the user interface for the specific user.

In some aspects, the techniques described herein relate to a computer device, wherein the first window of time includes a plurality of time periods, each time period associated with a different set of weights for the page views and page actions during a corresponding time period.

In some aspects, the techniques described herein relate to a computer device, wherein the collaborative filter uses a user-item transaction matrix, where a score for the item is based on the implicit rating of the user.

In some aspects, the techniques described herein relate to a computer device, wherein to monitor the user interactions, the user interface is configured to generate an object including user input and metadata.

In some aspects, the techniques described herein relate to a computer device, wherein the processing system is configured to classify the user input and metadata into a key-value pair that defines an event associated with a set of weights.

In some aspects, the techniques described herein relate to a computer device, wherein the model is represented by the weights of nodes in a neural network, wherein to train the model, the processing system is configured to calculate a gradient descent based on a difference between the rate of the goal action and the implicit rating.

In some aspects, the techniques described herein relate to a computer device, wherein the second window of time is the same as the first window of time.

In some aspects, the techniques described herein relate to a computer device, wherein the second window of time is a same duration as the first window of time measured back from a current time.

In some aspects, the techniques described herein relate to a computer device, wherein the processing system is further configured to: determine a first rate of the goal action on the user interface for a first group of users that receive a recommendation based on the implicit rating; determine a second rate of the goal action on the user interface for a second group of users that do not receive a recommendation based on the implicit rating; and continue use to use the model for the implicit rating when the first rate is higher than the second rate.

In some aspects, the techniques described herein relate to a computer device, herein the processing system is further configured to retrain the model when the second rate is higher than the first rate.

In some aspects, the techniques described herein relate to a method of recommending modifications to a user interface, including: monitoring, for a plurality of users, user interactions with a user interface prior to a goal action, the monitoring including collecting page views and page actions between each user and a local version of the user interface; training weights of a model, based on the collected page views and page actions over a first window of time, to generate an implicit rating that is predictive of the goal action, wherein the weights are based on a machine-learning training to improve a correlation of the implicit rating with a rate of the goal action on the user interface; generating the implicit rating for a specific user of at least one element of the user interface based on the weights of the model applied to each type of page view and page action of the user over a second window of time; and applying the implicit rating as an input to a collaborative filter to generate a recommendation to modify the local version of the user interface for the specific user.

In some aspects, the techniques described herein relate to a method, wherein the first window of time includes a plurality of time periods, each time period associated with a different set of weights for the page views and page actions during a corresponding time period.

In some aspects, the techniques described herein relate to a method, wherein the collaborative filter uses a user-item transaction matrix, where a score for the item is based on the implicit rating of the user.

In some aspects, the techniques described herein relate to a method, wherein the monitoring includes generating, by instrumentation within the user interface, an object including user input and metadata.

In some aspects, the techniques described herein relate to a method, wherein the monitoring includes classifying the user input and metadata into a key-value pair that defines an event associated with a set of weights.

In some aspects, the techniques described herein relate to a method, wherein the model is represented by the weights of nodes in a neural network, wherein training the model includes calculating a gradient descent based on a difference between the rate of the goal action and the implicit rating.

In some aspects, the techniques described herein relate to a method, further including modifying the local version of the user interface based on the recommendation to include a recommended element.

In some aspects, the techniques described herein relate to a method, wherein the recommended element is one of a content item within a frame of the user interface, a pop-up notification, or text within a chat interface.

In some aspects, the techniques described herein relate to a method, further including: determining a first rate of the goal action on the user interface for a first group of users that receive a recommendation based on the implicit rating; determining a second rate of the goal action on the user interface for a second group of users that do not receive a recommendation based on the implicit rating; and continuing use of the model for implicit rating when the first rate is higher than the second rate.

In some aspects, the techniques described herein relate to a method, further including retraining the model when the second rate is higher than the first rate.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 5 is a conceptual diagram of using collaborative filtering to recommend elements of a user interface, in accordance with an implementation of the present disclosure.

DETAILED DESCRIPTION

Figure 1:
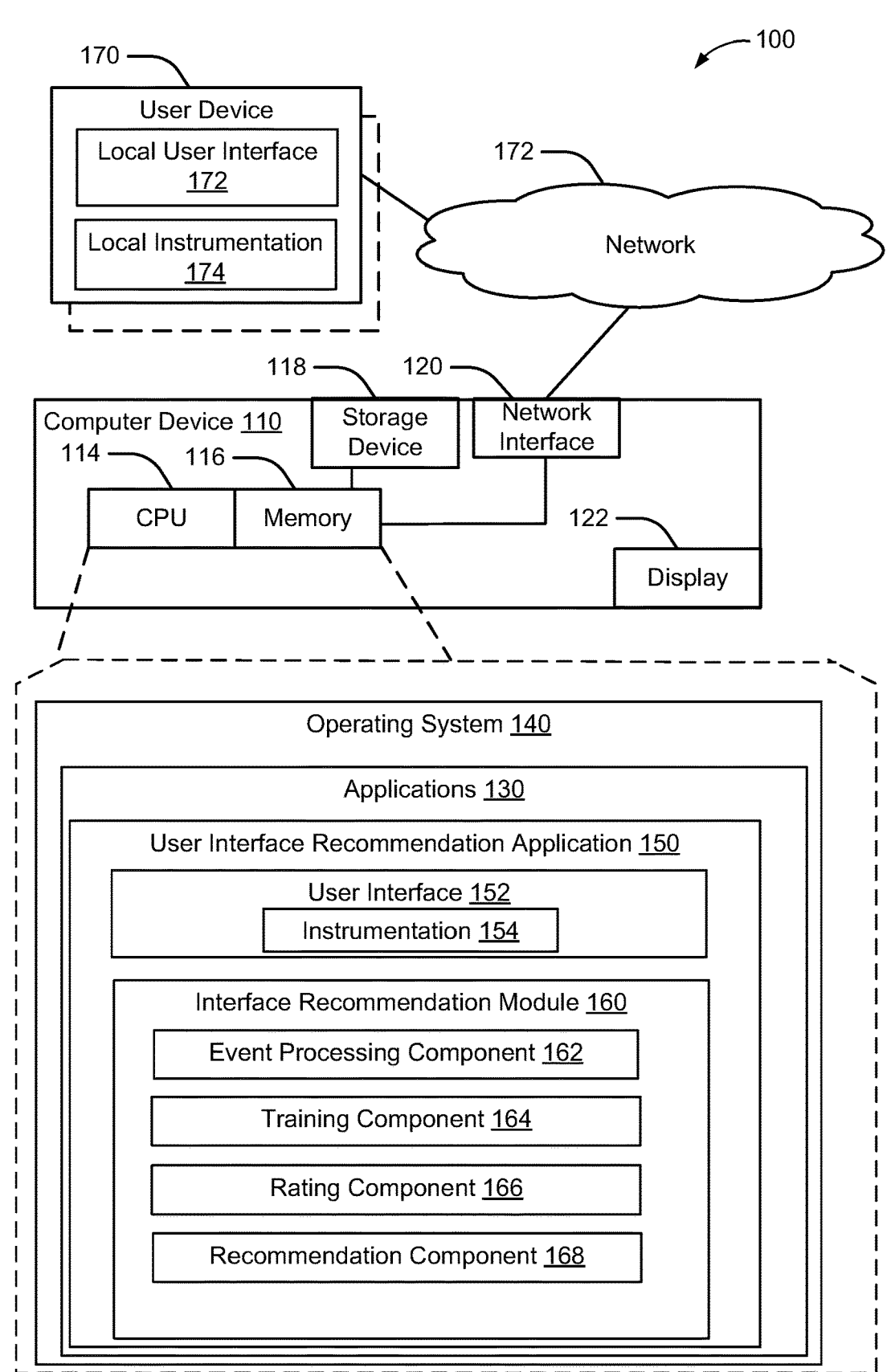
FIG. 1 is a diagram of an example computer system for providing and customizing a user interface, in accordance with an implementation of the present disclosure.

The present disclosure provides systems and methods for providing recommendations for a user interface. The disclosure provides techniques that allow a computer system provider (e.g., a website operator) to utilize user data including interactions with the user interface to generate an implicit rating of elements of the user interface that can be used to generate recommendations.

In some cases, an implicit rating may be generated based on user interaction with an element of a user interface. In one such technique, such implicit ratings may be based on knowledge of how users typically interact with a user interface (e.g., returning to an element multiple times). The knowledge may be used to generate weights for different user interactions to generate an implicit rating for an element. Such knowledge based implicit ratings, however, may be specific to a type of user interface or type of user. Further, such ratings may be based on errors or biases in human knowledge. Accordingly, user interface designers may not have reliable systems to provide data driven decisions with respect to recommendations for user interfaces.

One approach to improve upon known techniques for generating recommendations is the use of collaborative filtering, which uses a user-item transaction matrix and has a dependency on the item rating from user. Collaborative filtering, however, presents several technical challenges. First, there is often no explicit rating to understand if a user likes an element of the user interface or not. Second, user interaction data may not be directly indicative of user intent because an interaction may have a different intent in different contexts. Third, the volume of user interactions and number of possible events makes development of weights for calculating an implicit rating (e.g., based on knowledge) time consuming and not feasible when the number of actions on the transactional data is large, for example, on the scale of a website with thousands or millions of users. Finally, it is difficult to test and validate an implicit rating to see if the implicit rating really represents the intent of the user.

In an aspect, the present disclosure addresses these technical issues using an implicit rating based on a model that is trained to be predictive of a goal action. The goal action may refer to a specific user behavior such as a registration, purchase, download, or view, or the goal action may be a measured property of user behavior such as viewing time, number of views, number of clicks, number of engagements, or other desirable activity. The training data may include actual user interactions (e.g., click-stream data) that is classified into types of user behavior (e.g., page view and page actions) over a window of time prior to a goal action. The weights of a model may be trained based on user interactions for multiple users to generate an implicit rating that is predictive of the goal action. For example, a gradient decent may be used to adjust the weights to minimize a difference between the implicit rating and a rate of the goal action in the training data. The model may be used to generate an implicit rating for a user for one or more elements of the user interface. Collaborative filtering may then be used to generate recommendations based on both the similarities of users (e.g., based on the interactions of the users) and similarities of items (e.g., based on the implicit rating).

Accordingly, when the user interface is modified based on the recommendations, the user interface may be improved to increase the rate of the goal action. For example, the user interface may be modified to include content that the user is more likely to engage with, or to include options for accessing content that may be useful to the user (e.g., suggested guidance to using the user interface). Further, the performance of the implicit rating may be monitored by comparing a first group users of the modified user interface versus a second group of users of the unmodified user interface. The implicit rating may be retrained when the rate of the goal action for the modified user interface is not greater than the rate of the goal action for the unmodified user interface.

In an aspect, the use of an implicit rating of a user interface element using a machine-learning model may allow rating or recommendations for user interface elements without requiring explicit user input into a rating system. Further, training of the machine-learning model based on a desired goal action may provide an implicit rating that is indicative of objective goal rather than subjective opinion. Additionally, verification of the machine-learning model via comparison of rates of goal actions between treated and untreated groups may provide a feedback loop that ensures the model is achieving the goal.

Referring now to FIG. 1, an example user interface system 100 includes a central computer device 110 and a plurality of user devices 170. The central computer device 110 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing user interface data.

The computer device 110 may include a central processing unit (CPU) 114 that executes instructions stored in memory 116. For example, the CPU 114 may execute an operating system 140 and one or more applications 130, which may include a user interface evaluation application 150. The computer device 110 may also include a network interface 120 for communication with external devices via a network. For example, the computer device 110 may communicate with a plurality of user devices 170.

The computer device 110 may include a display 122. The display 122 may be, for example, a computer monitor or a touch-screen. The display 122 may provide information to an operator and allow the operator to configure the computer device 110.

Memory 116 may be configured for storing data and/or computer-executable instructions defining and/or associated with an operating system 140 and/or application 130, and CPU 114 may execute operating system 140 and/or application 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In an implementation, the memory 116 may include a storage device, which may be a non-volatile memory.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads.

The operating system 140 may include instructions (such as applications 130) stored in memory 116 and executable by the CPU 114. The applications 130 may include a user interface recommendation application 150 configured to recommend a change to a user interface. The user interface recommendation application 150 may publish a user interface 152, or may be in communication with or otherwise operate in conjunction with a published user interface 152. The user interface 152 may be any user interface with which an end user may interact. For example, the user interface 152 may be an application or operating system that runs on the user devices 170. The user interface evaluation application 150 may be associated or in communication with an online store or update service. Accordingly, the user interface evaluation application 150 may occasionally publish an updated version of the user interface 152 that may include changes to the user interface 152. As another example, the user interface 152 may be a web-page that is accessed through a browser application executed on the user devices 170. By loading the web-page, the browser application may effectively operate as a user interface for an application executed on the computer device 110 (e.g., in the case of a web server).

In an implementation, the user interface 152 may include monitoring instrumentation 154 for monitoring a user interaction with the user interface 152. The monitoring instrumentation 154 may collect data regarding the user interactions and provide the collected data to the user interface recommendation application 150. For example, the monitoring instrumentation 154 may track any user interactions (e.g., clicks, hovers, scrolls) with elements of the user interface 152. The monitoring instrumentation 154 may also determine a date, time, and an interaction amount for each user interaction, which may be included as metadata associated with the user interactions.

In an aspect, for example where the user interface 152 is a website, the monitoring instrumentation 154 may be provided as a software development kit (SDK) for providing tools that may be added to the website. An operator may host the website and monitoring instrumentation 154 on one or more enterprise servers or cloud servers (e.g., computer device 110).

The monitoring instrumentation 154 may provide the website with capability to monitor a user's interaction with the user interface 152 and generate contextual data for a session (e.g., user interaction with the website) leading to a goal action. In some cases, the user may be registered with a host of the user interface, and the interaction data may be associated with the registered user. In an implementation, the contextual data may include a device fingerprint identifying a hardware device (or virtual device) used to interact with the user interface 152. The device fingerprint may be a fuzzy identification of a user device that may be applicable across multiple sessions and properties (e.g., websites). The fuzzy identification may not require any specific piece of identification, but instead may be based on a set of available information. The available information may be hashed according to a defined algorithm to generate the device fingerprint such that when the set of available information is used for another session, the device can be identified. For example, the device fingerprint may be used as a user identifier to uniquely identify a user.

The user interface recommendation application 150 may include an interface recommendation module 160 that recommends content items to include in the user interface 152. In an aspect, the recommendations may be based on an implicit rating for one or more users of elements of the user interface. For example, the implicit rating for a user of an element of the user interface may indicate the likelihood of a user engaging in a goal action with the element.

The interface recommendation module 160 may include an event processing component 162 configured to collect page view and page actions between a user and the user interface 152. The interface optimization module 160 may include a training component 164 configured to train weights of a model, based on the collected page views and page actions over a first window of time, to generate an implicit rating that is predictive of the goal action. The weights are based on a machine-learning training to improve a correlation of the implicit rating with a rate of the goal action on the user interface. The user interface optimization module 160 includes a rating component 166 configured to generate the implicit rating for a specific user of at least one element of the user interface based on the weights of the model applied to each type of page view and page action of the user over a second window of time. The user interface optimization module 160 includes a recommendation component 168 configured to apply the implicit rating as an input to a collaborative filter to generate a recommendation to modify the user interface for the specific user.

Figure 2:
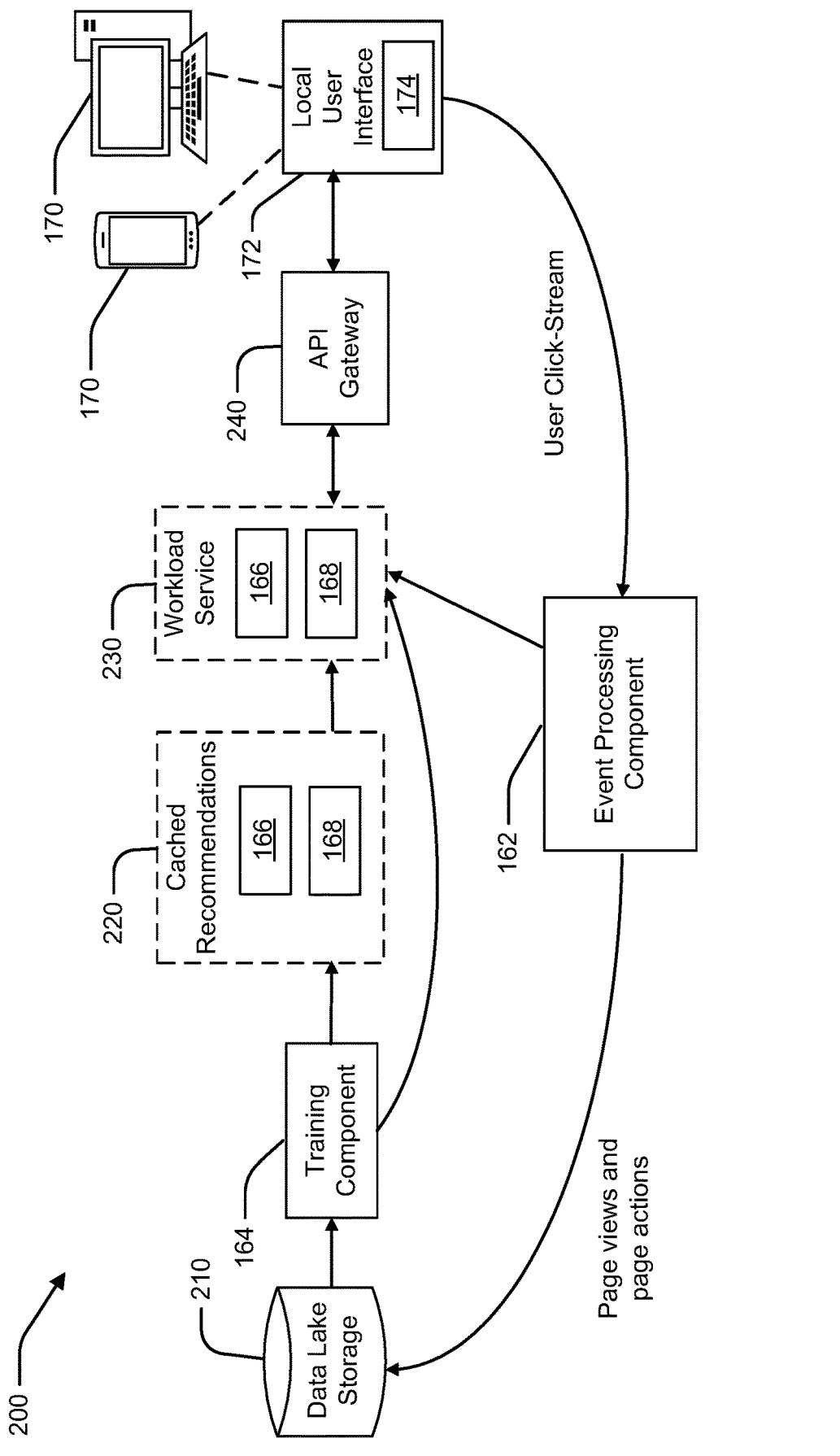
FIG. 2 is a diagram illustrating an example of a distributed system for providing and customizing a user interface, in accordance with an implementation of the present disclosure.

FIG. 2 is a diagram illustrating an example of a distributed system 200 for providing and customizing a user interface. The distributed system 200 may implement the components of the user interface recommendation application 150 on distributed resources, for example, in a cloud computing environment. For instance, in some implementations, each component may be implemented as a microservice operating on one or more virtual machines instantiated on one or more hardware servers at one or more datacenters.

The user interface 152 may be deployed on user devices 170 as a local user interface 172 including the local user instrumentation 174. The local user instrumentation may monitor user interactions with the local user interface 172. For example, the user interactions may be monitored continuously to detect interactions both before and after a goal action. The instrumentation 174 may output a user click-stream to an event processing component 162. The user click-stream may include objects including user input and metadata. For instance, in some implementations, the click-stream may be represented as JavaScript Object Notation (JSON) objects.

The event processing component 162 may collect the user click-stream data for a plurality of users. The event processing component 162 may classify the user input and metadata of the click-stream into behaviors, which may be represented as key-value pairs defining events such as page views and page actions. In some implementations, each behavior may be associated with a weight within a machine-learning model. The following Table 1 includes example key-value pairs for user interface events. It should be understood that the example key-value pairs may be expanded for a particular user interface based on the user interaction options.

TABLE 1

| Key | Value | Explanation |
| --- | --- | --- |
| 0.0 | Content Update | Scrolling, changing zoom |
| 1.0 | Navigation Back | Navigating webpage back |
| 2.0 | Navigation Selection | Clicking on a list of navigation options |
| 3.0 | Navigation Forward | Navigating webpage anchors |
| 4.0 | Expand Content | Expanding to show the collapsible content |
| 5.0 | Play Video | Clicking video play |
| 6.0 | Download | Clicking download |
| . . . | . . . | . . . |

The data lake storage 210 may store the page views and page actions of a user. In some implementations, the user behaviors may be stored in association with various time periods. For example, a user may engage with a user interface on multiple occasions over several days before performing a goal action. In some implementations, the user data in the data lake storage may be supplemented with additional information about the user such as a search history or purchasing history.

The training component 164 is configured to train weights for a model based on the collected page view and page actions in the data lake storage 210. The training may be based on a first window of time. For example, during training, the first window of time may be based on a duration of time prior to a goal action. The training component 164 may select page views and page actions during the first window of time for each user that performed the goal action. The training component 164 may employ various types of models for generating an implicit rating. For example, the training component 164 may train one or more of a light graph convolutional network (LightGCN), smart adaptive recommendations (SAR), or Bayesian personalized ranking (BPR). In some implementations, the implicit rating may be based on a weights for each behavior ($W_i$) and a corresponding number of occurrences ($X_i$) of each behavior. For example, Equation 1 is a definition of a first example implicit rating.

$$\text{Implicit Rating(IR)}=W_1{}^*X_1+W_2{}^*X_2+\ldots+W_{n-1}{}^*X_{n-1}+W_n{}^*X_n \qquad \text{(Equation 1)}$$

The model for the implicit rating may be trained for one or more goal actions. A goal action may refer to any detectable user behavior that is desired. An example goal action may be a user conversion and a goal metric may be a conversion rate defined by a number of purchased visits divided by a number of total visits. Another example goal action may be a click through and a goal metric may be click through rate defined by a number of clicked visits divided by a number of total visits. The goal actions may be selected based on the goal of the particular user interface. Other example goal actions may include enrolling, downloading a file or update, posting content, or otherwise becoming more engaged with the user interface. In an implementation, a goal setting (GS) may be based on a number of goal actions (Y1, Y2) and an action weight (a1, a2) during the first window of time, where multiple goal actions may be assigned different weights. A GS to train the model for either of two goal actions may use Equation 2:

$$GS=a_1{}^*Y_1+a_2{}^*Y_2 \qquad \text{(Equation 2)}$$

The machine-learning model may be trained using either linear regression or non-linear regression, for example, with an explicit mathematical linear equation or a neural network to improve correlation between the implicit rating (IR) and the (GS) for an element of the user interface. For example, the regression analysis may minimize the difference between IR and GS by adjusting the weights (W). In a first example, For instance, in some implementations, the weights may be associated with nodes in a neural network. For instance, an input layer may include a plurality of nodes, each node having a weight associated with one of the page views or page actions. The neural network may include hidden layers that combine the various page views and page actions. The training component 164 may calculate a gradient descent based on a difference between the rate of the goal action and the implicit rating output by the model. The weights W may be adjusted according to the gradient descent.

In some implementations, the user experience with the user interface may span a longer period of time. A time window of user interactions may be divided into a plurality of time periods. The weight (W) and number of occurrences (X) may be tracked for an $i^{th}$ time period and $j^{th}$ behavior. Equation 3 defines a second example implicit rating for n behaviors over m time periods.

$$IR=(W_{1,1}*X_{1,1}+W_{1,2}*X_{1,2}+ \ldots +W_{1,n}*X_{1,n})+(W_{2,1}*X_{2,1}+W_{2,2}*X_{2,2}+ \ldots +W_{2,n}*X_{2,n})+ \ldots (W_{m,1}*X_{m,1}+W_{m,2}*X_{n,2}+ \ldots +W_{m,n}*X_{m,n}) \quad \text{(Equation 3)}$$

In some implementations, a regression model may provide an estimate of the GS. The regression model may be expressed as a linear equation for an estimate of user i and item j of dependent variable GS. In Equation 4, the parameter $b_0$ is an estimate of the regress intercept. $W_{t,n}$ is the estimated weight on time window t of event n for observation user i on item j. $X_n$ is the value of X for event n for observation user i on item j.

$$GS_{ij}=b_0+(W_{11}*X_{11}+W_{12}*X_{12}+ \ldots +W_{1n}*X_{1n})+ (W_{21}*X_{21}+W_{22}*X_{22}+ \ldots +W_{2n}*X_{2n})+ \ldots +(W_{nn}*X_{n1}+W_{n2}*X_{n2}+ \ldots +W_{nn}*X_{nn}) \quad \text{(Equation 4)}$$

In another example, a linear equation for the GS may be expressed as an estimate of user i and item j of dependent variable GS, where there are n independent variables and $$x_{ij}^{(nm)}$$

denotes the user i and item j of the $n^{th}$ independent variable (user interaction feature) in the time window of n. Equation 5 defines an example multivariate linear regression.

$$GS_{ij} = \alpha + \left(w_{11}x_{ij}^{(11)} + w_{12}x_{ij}^{(12)} + \ldots + w_{1n}x_{ij}^{(1n)}\right) + \left(w_{21}x_{ij}^{(21)} + w_{22}x_{ij}^{(22)} + \ldots + w_{2n}x_{ij}^{(2n)}\right) + \ldots + \left(w_{m1}x_{ij}^{(m1)} + w_{m2}x_{ij}^{(m2)} + \ldots + w_{mn}x_{ij}^{(mn)}\right) \quad \text{(Equation 5)}$$

To generalize the equation, the interaction features can be converted on various time windows into yet another set of interactions. In Equation 6, parameter, n, denotes the total number of independent variables in all the time windows.

$$GS_{ij} = \alpha + w_1 x_{ij}^{(1)} + w_2 x_{ij}^{(2)} + \ldots + w_n x_{ij}^{(n)} \quad \text{(Equation 6)}$$

Similarly, Equation 7 represents a cost function to be minimized. In Equation 6, there are k data points in training data and gs is the observed data of the dependent variable. In an implementation, a correlation metric may be based on the observed data for user interaction features and the goal setting. User interaction features with high correlation values may be added into the regression model until there is no significant improvement in the estimation.

$$E(\alpha, w_1, w_2, \ldots, w_n) = \frac{1}{2k} \sum_{i=1}^{k} (gs_{ij} - GS_{ij})^2 \quad \text{(Equation 7)}$$

Figure 3:
FIG. 3 is an example of a single layer neural network that may be trained to determine the implicit rating, in accordance with an implementation of the present disclosure.

FIG. 3 is an example of a single layer neural network 300 that may be trained to determine the implicit rating. The single neural network 300 includes an input layer 310 with data values and the output layer 330 as a weighted sum. On the input layer 310, there are n variables $$x_{ij}^{(n)}$$

as the input. The parameter, n, denotes the total number of independent variables in all the time windows. The weights and bias of the single layer neural network 300 may be initialized, for example, based on knowledge of relative importance of the inputs. All the inputs x are multiplied with their weights w 320. The output layer 330 outputs the weighted sum. The neural network training process compares calculated weighted sum—the estimated value with the target.

Figure 4:
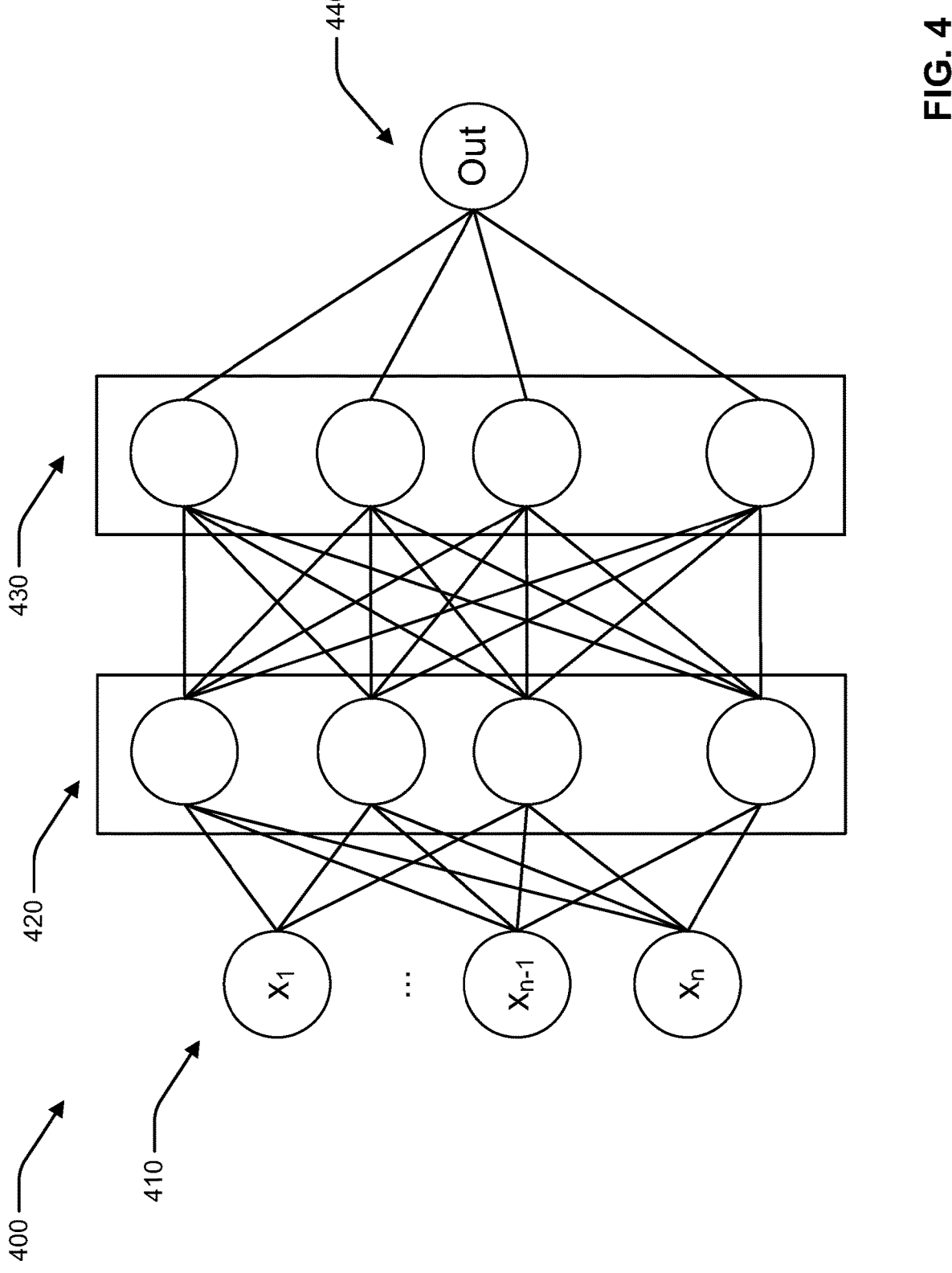
FIG. 4 is an example of a non-linear multi-layer neural network that may be trained to determine the implicit rating, in accordance with an implementation of the present disclosure.

FIG. 4 is an example of a non-linear multi-layer neural network 400 that may be trained to determine the implicit rating. The non-linear multi-layer neural network 400 may be used for a large number of user interaction features. The non-linear multi-layer neural network 400 may use multiple dense layers and one single node output layer 440. On the input layer 410, there are n variables $$x_{ij}^{(n)}$$

as the input. The parameter, n, denotes the total number of independent variables in all the time windows. The weights and bias of the multi-layer neural network 400 may be initialized, for example, based on knowledge of relative importance of the inputs. On each hidden layer 420, 430, the inputs are multiplied with their weights. The result is used on the next layer as input. The dense hidden layers populate those inputs and output forward. The output layer 440 contains the single node with the weighted sum of the last hidden layer. The neural network training process compares calculated weighted sum—the estimated value with the target.

In an aspect, the trained model may generate an implicit rating, which may be used for collaborative filtering to generate recommendations. Details of an example of collaborative filtering are discussed below with respect to FIG. 5. The implicit rating model may be applied to generate an implicit rating for a specific user of at least one element of the user interface based on the weights of the model applied to each type of page view and page action of the user over a second window of time.

Referring back to FIG. 2, in some implementations, recommendations for a user based on the data lake storage 210 may be cached. For instance, cached recommendations 220 may be a database that stores cached recommendations for a user. When generating the cached recommendations 220, the second window of time may be the same as the first window of time. For example, the rating component 166 may apply the trained implicit rating model to the data in the data lake storage 210 for the specific user over the first window of time to generate an implicit rating for each of one or more user interface elements. The recommendation component 168 may then apply the implicit rating to a collaborative filter to generate a recommendation to modify the user interface for the specific user.

In some implementations, the recommendations may be generated in real-time using a click stream of the user. For example, a workload service 230 may be provisioned with the trained model for the implicit rating. The workload service 230 may receive user behavior data from either the event processing component 162 or via an API gateway 240. The workload service 230 may execute the rating component 166 to generate an implicit rating for one or more user interface elements as the user interacts with the local user interface 172. The second window of time may have a same duration as the first window of time measured back from a current time. Accordingly, the implicit rating of the user may be continuously updated based on recent user behavior. The workload service 230 may execute the recommendation component 168 to generate recommendations to modify the local user interface 172.

In an aspect, the API gateway 240 may be configured for fetch cached recommendations 220 via the workload service 230. The API gateway 240 may be configured to perform real-time inference using the workload service 230 (e.g., by providing the user behavior to the workload service 230). The API gateway 240 may receive the recommendations from the workload service 230. The API gateway 240 may push the recommendations to the local user interface 172 to modify the local user interface 172 for the specific user. For example, the recommendation may be to replace a user interface element with another user interface element with which the user is more likely to interact. As another example, a recommendation may be presented as a pop-up element or a suggestion within another element (e.g., within a chat interface).

Figure 5:
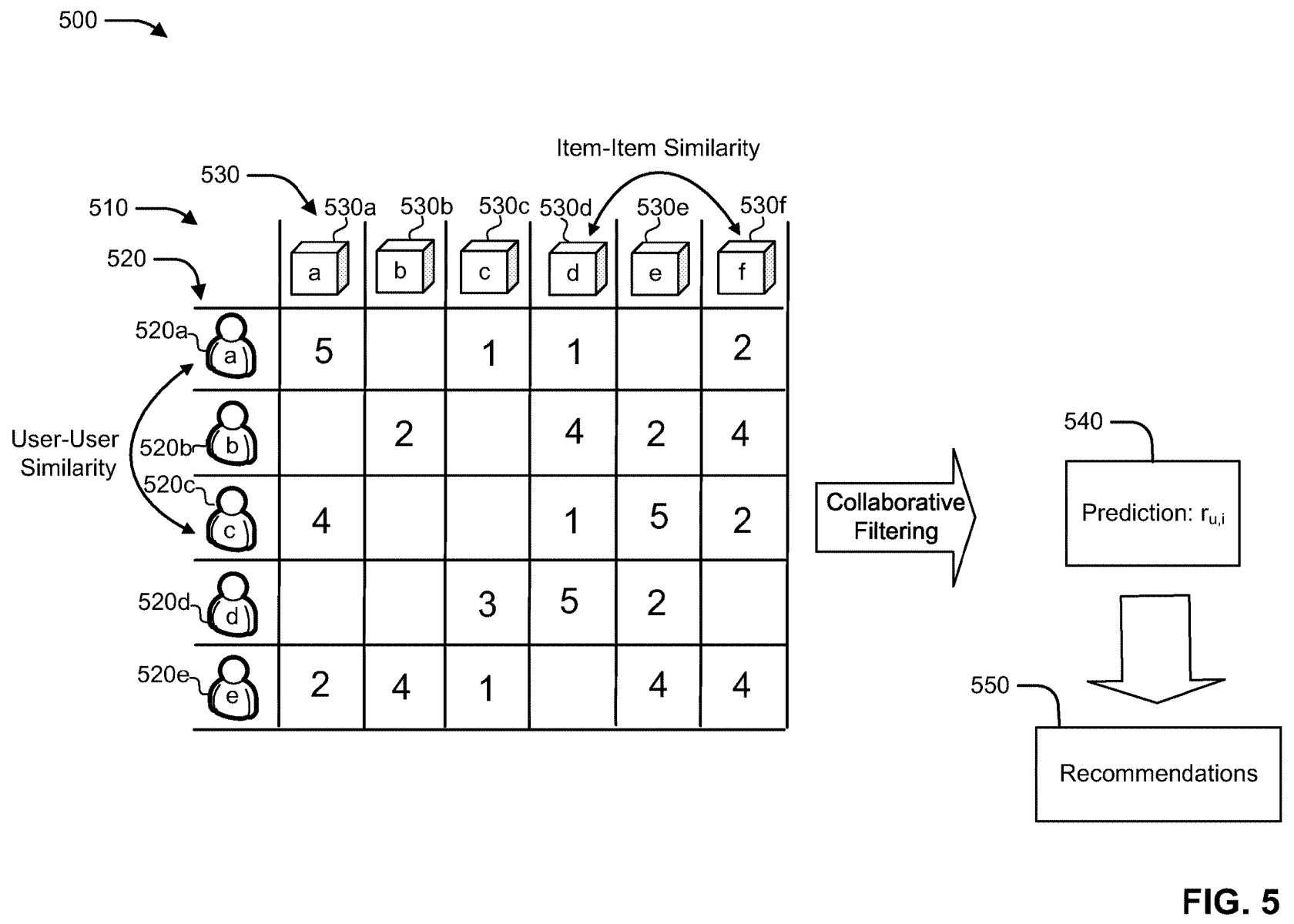

FIG. 5 is a conceptual diagram 500 of using collaborative filtering to recommend elements of a user interface (e.g., local user interface 172). In an aspect, collaborative filtering may utilize a user-item transaction matrix 510 that represents user scores for each item. For example, each user 520 (e.g., users 520a, 520b 520c, 520d, 520c) may be associated with a score for one or more items 530 (e.g., items 530a, 530b, 530c, 530d, 530c, 530f). Conventionally, collaborative filtering may utilize explicit user scores for items. For instance, in a user interface for a commercial website, users may explicitly rate items that they have purchased. For many user interfaces, however, such explicit ratings are not available. In an aspect, the scores in the matrix 510 may be the implicit ratings discussed above, where the items are user interface elements. The implicit score may be generated for one or more user interface elements with that the user has interacted. Accordingly, elements with which the user did not interact may not be associated with a score.

Collaborative filtering may utilize both item-item similarity and user-user similarity to recommend items for a user. For example, item-item similarity may refer to items where multiple users have resulted in a similar score for the item. For example, as illustrated, three users have a score for both items 530d and 530f, and the score from each user is approximately the same. A user-user similarity may refer to similar preferences among users. For instance, user 520a and user 520c have both interacted with items 530a, 530d, and 530f, and the scores from each user are approximately the same. The collaborative filtering may make a prediction

540 for an item and user based on the item-item similarity and the user-user similarity. For instance, because user 520a and user 520c have a high user-user similarity, the collaborative filtering may recommend items to user 520a that have a high item-item similarity to items scored highly for user 520c. For example, collaborative filtering may generate a high prediction 540 for item 530b for user 520a because item 530b has a high item-item similarity to item 530e, which also received a high score for user 520c. In an aspect, the recommendation component 168 may generate a prediction 540 for each item 530 for a user 520. The recommendation component 168 may then order the items 530 by prediction and recommend the items with the highest predictions.

As noted above, the use of implicit ratings, may allow for recommendations for user interface elements that are not explicitly rated by users. Additionally, the recommendations may be targeted towards different types of goals depending on the selection of the goal setting used to determine the weights of the implicit rating.

Figure 6:
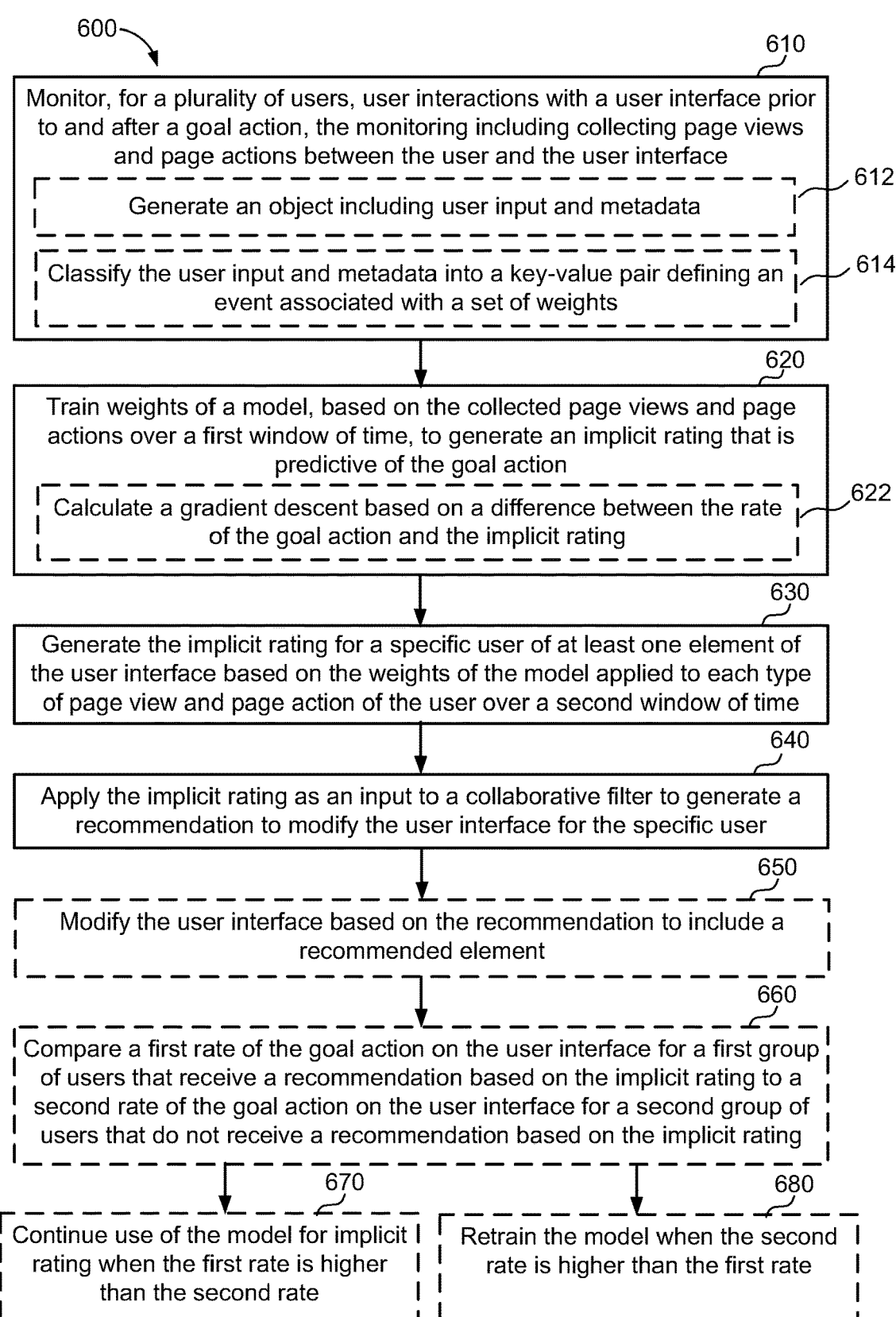
FIG. 6 is a flowchart of an example method of customizing a user interface, in accordance with an implementation of the present disclosure.

FIG. 6 is a flowchart of an example method 600 of customizing a user interface. For example, method 600 may be performed by the user interface recommendation application 150 on the computer device 110 or in the distributed system 200.

At block 610, the method 600 may include monitoring user interactions with a user interface prior to and after a change to the user interface. For instance, in an implementation, the user interface 152, the monitoring instrumentation 154, the local user interface 172, the local instrumentation 174, and/or the event processing component 162 may monitor, for a plurality of users, user interactions with a user interface 152, 172 prior to a goal action. The monitoring includes collecting page views and page actions between each user and a local version of the user interface 172. At sub-block 612, the block 610 may include generating an object including user input and metadata. For example, the instrumentation 154, 174 may generate a JSON object including user input and metadata. The instrumentations 154, 174 may provide the JSON object to the event processing component 162. At sub-block 614, the block 610 may include classifying the user input and metadata into a key-value pair defining an event associated with a set of weights. For instance, the event may be either a page view or a page action. The event processing component 162 may output the events for storage in the data lake storage 210.

At block 620, the method 600 may include training weights of a model, based on the collected page views and page actions over a first window of time to generate an implicit rating that is predictive of the goal action. For instance, in an implementation, the training component 164 may train weights of a model, based on the collected page views and page actions over a first window of time, to generate an implicit rating that is predictive of the goal action. The weights are based on a machine-learning training to improve a correlation of the implicit rating with a rate of the goal action on the user interface. For example, at sub-bock 622, the training component 164 may calculate a gradient descent based on a difference between the rate of the goal action and the implicit rating.

At block 630, the method 600 includes generating the implicit rating for a specific user of at least one element of the user interface based on the weights of the model applied to each type of page view and page action of the user over a second window of time. For instance, in an implementation, the rating component 166 may generate the implicit rating for a specific user (e.g., user 520a) of at least one element (e.g., item 530*b*) of the user interface 152, 172 based on the weights of the model applied to each type of page view and page action of the user over a second window of time.

At block 640, the method 600 may include applying the implicit rating as an input to a collaborative filter to generate a recommendation to modify the user interface for the specific user. In an implementation, for instance, the recommendation component 168 may apply the implicit rating as an input to a collaborative filter (e.g., matrix 510) to generate a recommendation 550 to modify the user interface 152, 172 for the specific user 520*a*.

At block 650, the method 600 may optionally include modifying the user interface based on the recommendation to include a recommended element. In an implementation, for example, the user interface 152, 172 and/or the API gateway 240 may modify the user interface 152, 172 based on the recommendation 550 to include a recommended element (e.g., item 530*e*). For example, the recommended element may be presented as one of a content item within a frame of the user interface, a pop-up notification, or text within a chat interface.

At block 660, the method 600 may optionally include comparing a first rate of the goal action on the user interface for a first group of users that receive a recommendation based on the implicit rating to a second rate of the goal action on the user interface for a second group of users that do not receive a recommendation based on the implicit rating. For example, the training component 164 may compare the first rate to the second rate. At block 670, the method 600 may optionally include continuing use of the model for implicit rating when the first rate is higher than the second rate. In contrast, at block 680, the method 600 may optionally include retraining the model when the second rate is higher than the first rate.

Figure 7:
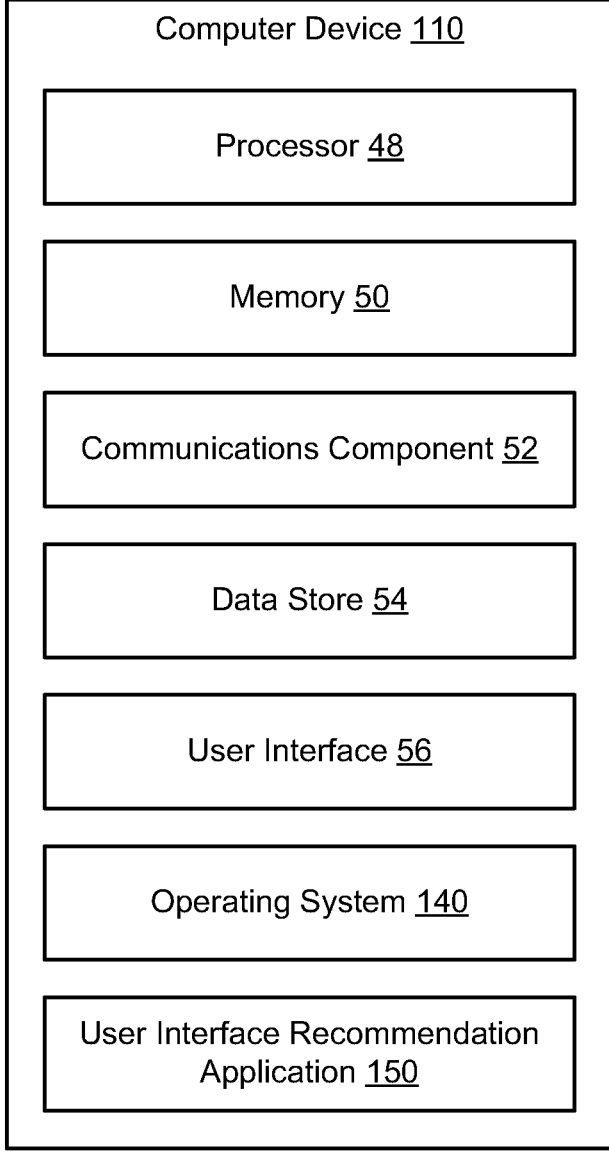
FIG. 7 is a schematic block diagram of an example computer device, in accordance with an implementation of the present disclosure.

Referring now to FIG. 7, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114.

In an example, computer device 110 may include memory 50 for storing instructions executable by the processor 48 for carrying out the functions described herein. In an implementation, for example, memory 50 may include memory 116. The memory 50 may include instructions for executing the user interface evaluation application 150.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 and/or applications 130. The data store may include memory 116 and/or storage device 118.

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or applications 130. In addition, processor 48 may execute operating system 140 and/or applications 130, and memory 50 or data store 54 may store them.

The following numbered clauses provide an overview of aspects of the present disclosure:

Aspect 1: A computer device for customizing a user interface, comprising: a memory; and a processing system comprising at least one processor communicatively coupled with the memory and configured to: monitor, for a plurality of users, user interactions with a user interface prior to a goal action, the monitoring including collecting page views and page actions between each user and a local version of the user interface; train weights of a model, based on the collected page views and page actions over a first window of time, to generate an implicit rating that is predictive of the goal action, wherein the weights are based on a machine-learning training to improve a correlation of the implicit rating with a rate of the goal action on the user interface; generate the implicit rating for a specific user of at least one element of the user interface based on the weights of the model applied to each type of page view and page action of the user over a second window of time; and apply the implicit rating as an input to a collaborative filter to generate a recommendation to modify the local version of the user interface for the specific user.

Aspect 2: The computer device of Aspect 1, wherein the first window of time includes a plurality of time periods, each time period associated with a different set of weights for the page views and page actions during a corresponding time period.

Aspect 3: The computer device of Aspect 1 or 2, wherein the collaborative filter uses a user-item transaction matrix, where a score for the item is based on the implicit rating of the user.

Aspect 4: The computer device of any of claims 1-3, wherein to monitor the user interactions, the user interface is configured to generate an object including user input and metadata.

Aspect 5: The computer device of Aspect 4, wherein the processing system is configured to classify the user input and metadata into a key-value pair that defines an event associated with a set of weights.

Aspect 6: The computer device of any of Aspects 1-5, wherein the model is represented by the weights of nodes in a neural network, wherein to train the model, the processing system is configured to calculate a gradient descent based on a difference between the rate of the goal action and the implicit rating.

Aspect 7: The computer device of any of Aspects 1-6, wherein the second window of time is the same as the first window of time.

Aspect 8: The computer device of any of Aspects 1-6, wherein the second window of time is a same duration as the first window of time measured back from a current time.

Aspect 9: The computer device of any of Aspects 1-8, wherein the processing system is further configured to: determine a first rate of the goal action on the user interface for a first group of users that receive a recommendation based on the implicit rating; determine a second rate of the goal action on the user interface for a second group of users that do not receive a recommendation based on the implicit rating; and continue use to use the model for the implicit rating when the first rate is higher than the second rate.

Aspect 10: The computer device of Aspect 9, herein the processing system is further configured to retrain the model when the second rate is higher than the first rate.

Aspect 11: A method of recommending modifications to a user interface, comprising: monitoring, for a plurality of users, user interactions with a user interface prior to a goal action, the monitoring including collecting page views and page actions between each user and a local version of the user interface; training weights of a model, based on the collected page views and page actions over a first window of time, to generate an implicit rating that is predictive of the goal action, wherein the weights are based on a machine-learning training to improve a correlation of the implicit rating with a rate of the goal action on the user interface; generating the implicit rating for a specific user of at least one element of the user interface based on the weights of the model applied to each type of page view and page action of the user over a second window of time; and applying the implicit rating as an input to a collaborative filter to generate a recommendation to modify the local version of the user interface for the specific user.

Aspect 12: The method of Aspect 11, wherein the first window of time includes a plurality of time periods, each time period associated with a different set of weights for the page views and page actions during a corresponding time period.

Aspect 13: The method of Aspect 11 or 12, wherein the collaborative filter uses a user-item transaction matrix, where a score for the item is based on the implicit rating of the user.

Aspect 14: The method of any of Aspects 11-13, wherein the monitoring comprises generating, by instrumentation within the user interface, an object including user input and metadata.

Aspect 15: The method of Aspect 14, wherein the monitoring comprises classifying the user input and metadata into a key-value pair that defines an event associated with a set of weights.

Aspect 16: The method of any of Aspects 11-15, wherein the model is represented by the weights of nodes in a neural network, wherein training the model comprises calculating a gradient descent based on a difference between the rate of the goal action and the implicit rating.

Aspect 17: The method of any of Aspects 11-16, further comprising modifying the local version of the user interface based on the recommendation to include a recommended element.

Aspect 18: The method of Aspect 17, wherein the recommended element is one of a content item within a frame of the user interface, a pop-up notification, or text within a chat interface.

Aspect 19: The method of any of Aspects 11-18, further comprising: comparing a first rate of the goal action on the user interface for a first group of users that receive a recommendation based on the implicit rating to a second rate of the goal action on the user interface for a second group of users that do not receive a recommendation based on the implicit rating; and continuing use of the model for implicit rating when the first rate is higher than the second rate.

Aspect 20: The method of Aspect 19, further comprising retraining the model when the second rate is higher than the first rate.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device for customizing a user interface, comprising:
   a memory; and
   a processing system comprising at least one processor communicatively coupled with the memory and configured to:
      collect page views and page actions between each user of a plurality of users and a local version of a user interface prior to a goal action;
      train weights of a model that is configured to generate an implicit rating that is predictive of the goal action, wherein to train the weights of the model, the processor is configured to:
         compute a goal-setting variable as a weighted combination of counts of a plurality of different goal actions observed in a first window; and
         minimize a difference between the implicit rating and the goal-setting variable by adjusting the weights;
      generate the implicit rating for a specific user of at least one element of the user interface based on the adjusted weights of the model applied to each type of page view and page action of the user over a second window of time; and
      recommended modification of the local version of the user interface for the specific user by applying the implicit rating as an input to a collaborative filter.

2. The computer device of claim 1, wherein the first window of time includes a plurality of time periods, each time period associated with a different set of weights for the page views and page actions during a corresponding time period.

3. The computer device of claim 1, wherein the collaborative filter uses a user-item transaction matrix, wherein a score for an item is based on the implicit rating of the user.

4. The computer device of claim 1, wherein to collect page views and page actions, the user interface is configured to generate an object including user input and metadata.

5. The computer device of claim 4, wherein the processing system is configured to classify the user input and metadata into a key-value pair that defines an event associated with a set of weights.

6. The computer device of claim 1, wherein the model is represented by the weights of nodes in a neural network, wherein to train the model, the processing system is configured to calculate a gradient descent based on a difference between the rate of the goal action and the implicit rating.

7. The computer device of claim 1, wherein the second window of time is the same as the first window of time.

8. The computer device of claim 1, wherein the second window of time is a same duration as the first window of time measured back from a current time.

9. The computer device of claim 1, wherein the processing system is further configured to:
   determine a first rate of the goal action on the user interface for a first group of users that receive a recommendation based on the implicit rating;
   determine a second rate of the goal action on the user interface for a second group of users that do not receive a recommendation based on the implicit rating; and
   continue use of the model for the implicit rating when the first rate is higher than the second rate.

10. The computer device of claim 9, wherein the processing system is further configured to retrain the model when the second rate is higher than the first rate.

11. A method of recommending modifications to a user interface, comprising:

collecting page views and page actions between each user of a plurality of users and a local version of a user interface prior to a goal action;

training weights of a model that is configured to generate an implicit rating that is predictive of the goal action, wherein training the weights of the model comprises:

computing a goal-setting variable as a weighted combination of counts of a plurality of different goal actions observed in a first window; and minimizing a difference between the implicit rating and the goal-setting variable by adjusting the weights;

generating the implicit rating for a specific user of at least one element of the user interface based on the adjusted weights of the model applied to each type of page view and page action of the user over a second window of time; and generating a recommended modification of the local version of the user interface for the specific user by applying the implicit rating as an input to a collaborative filter.

12. The method of claim 11, wherein the first window of time includes a plurality of time periods, each time period associated with a different set of weights for the page views and page actions during a corresponding time period.

13. The method of claim 11, wherein the collaborative filter uses a user-item transaction matrix, wherein a score for an item is based on the implicit rating of the user.

14. The method of claim 11, wherein the collecting comprises generating, by instrumentation within the user interface, an object including user input and metadata.

15. The method of claim 14, wherein the collecting comprises classifying the user input and metadata into a key-value pair that defines an event associated with a set of weights.

16. The method of claim 11, wherein the model is represented by the weights of nodes in a neural network, wherein training the model comprises calculating a gradient descent based on a difference between the rate of the goal action and the implicit rating.

17. The method of claim 11, further comprising modifying the local version of the user interface based on the recommendation to include a recommended element.

18. The method of claim 17, wherein the recommended element is one of a content item within a frame of the user interface, a pop-up notification, or text within a chat interface.

19. The method of claim 11, further comprising:

comparing a first rate of the goal action on the user interface for a first group of users that receive a recommendation based on the implicit rating to a second rate of the goal action on the user interface for a second group of users that do not receive a recommendation based on the implicit rating; and continuing use of the model for implicit rating when the first rate is higher than the second rate.

20. The method of claim 19, further comprising retraining the model when the second rate is higher than the first rate.

* * * * *